350-446

OR 3,632,191

United States [11] 3,632,191

| [72] | Inventor | James E. Cox |
| | | Kettering, Ohio |
| [21] | Appl. No. | 22,981 |
| [22] | Filed | Mar. 26, 1970 |
| [45] | Patented | Jan. 4, 1972 |
| [73] | Assignee | Magnavue, Inc. |
| | | Dayton, Ohio |

[54] MIRROR AND LENS ASSEMBLY
5 Claims, 7 Drawing Figs.

[52] U.S. Cl. .................................................... 350/202,
132/83 R, 206/38 R, 220/82 A, 350/252
[51] Int. Cl. .......................................................G02b 17/08,
G02b 7/02, A45d 33/00
[50] Field of Search.............................................. 350/202,
288, 251, 201, 252; 132/79 F, 79 G, 82 F, 83 R, 83
E, 83 F; 206/37 A, 38 R; 220/82 A, DIG. 26

[56] References Cited
UNITED STATES PATENTS

| 2,905,054 | 9/1959 | Logan ........................... | 350/251 |
| 3,006,252 | 10/1961 | Kacowski ..................... | 350/299 X |
| 3,374,047 | 3/1968 | Gatchell ....................... | 350/296 X |
| 3,527,524 | 9/1970 | Pace et al. .................... | 350/202 |
| 3,527,527 | 9/1959 | Manowitz..................... | 132/83 E |

FOREIGN PATENTS

| 1,033,523 | 4/1953 | France ......................... | 350/251 |

OTHER REFERENCES

" Pin–Point RX Mirror" Vol. 60 No. 3 Optometric Weekly p. 50 (Jan. 16, 1969)

*Primary Examiner*—David Schonberg
*Assistant Examiner*—John W. Leonard
*Attorney*—William R. Jacox

ABSTRACT: A mirror and lens assembly which is particularly for use by a person who normally requires corrective means, such as "glasses" as a visual aid for observing objects relatively close to his eyes. The invention is particularly adapted to serve as a "closeup " mirror unit for a farsighted person when the person is not wearing his corrective "glasses." A lens is disposed in front of a mirror, either in engagement therewith or spaced slightly therefrom, to refract light rays which are reflected from the mirror.

PATENTED JAN 4 1972 3,632,191
FIG-1
FIG-2
FIG-3
FIG-4
FIG-5
FIG-6
FIG-7
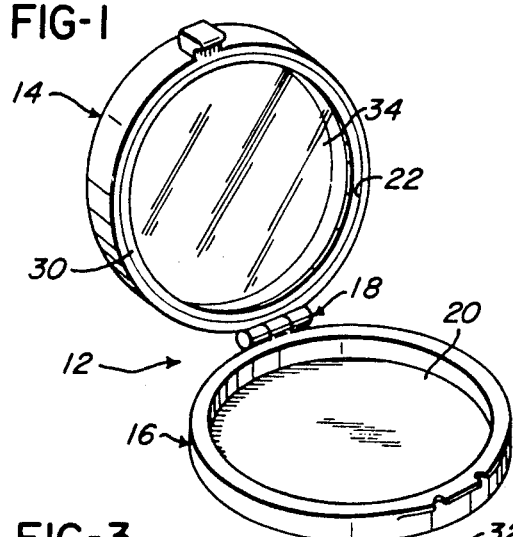
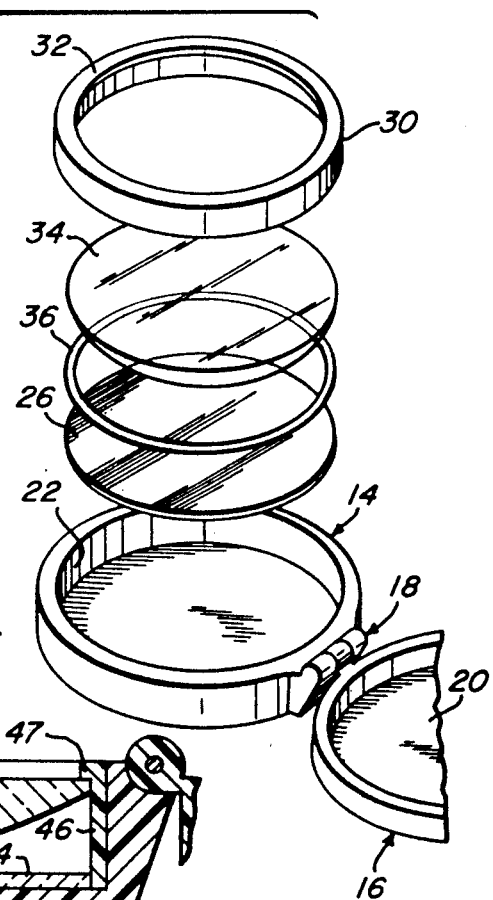
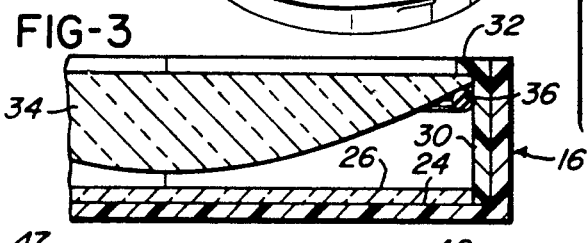
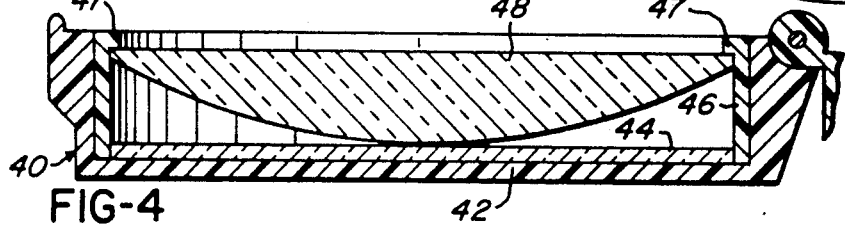
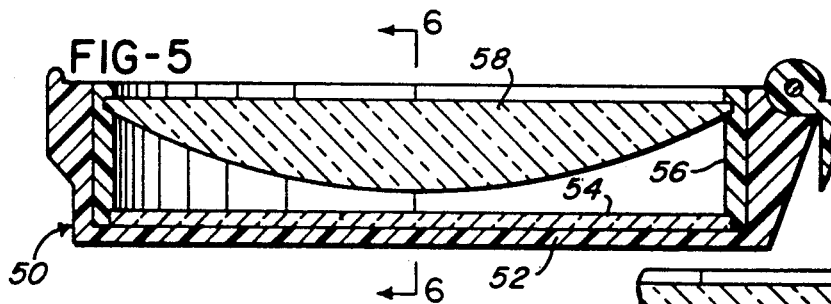
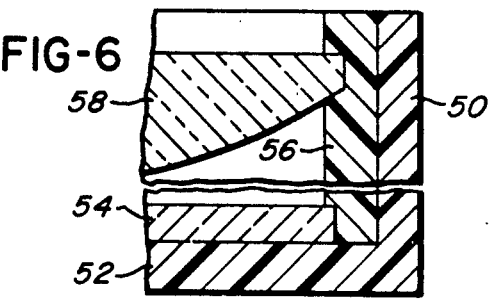
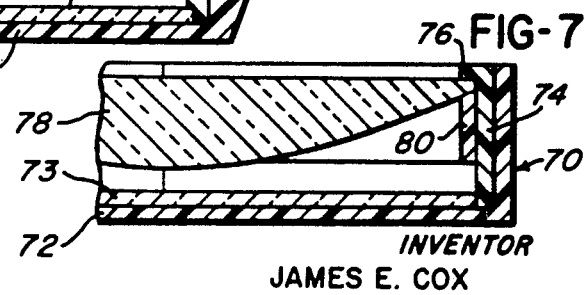
INVENTOR
JAMES E. COX
BY *William R Jacox*
ATTORNEY

MIRROR AND LENS ASSEMBLY

BACKGROUND OF THE INVENTION

A person who wears "glasses" usually must remove the "glasses" in order personally to apply cosmetics or the like to the facial regions adjacent his own eyes. The person requires a mirror to apply such cosmetics to his own face and eye regions. However, when a far-sighted (hypermetropia) person, without his "glasses," attempts to use a plane mirror to observe his own facial image at close range, he finds that he cannot see his facial image very well in the mirror.

It is an object of this invention to provide a mirror and lens assembly which enables a far-sighted person to see his facial image clearly as he looks into the mirror at close range without his corrective "glasses".

It is another object of this invention to provide such an assembly which may be a part of a lady's compact or the like.

It is another object to provide such an assembly which can be produced at relatively low costs.

BRIEF DESCRIPTION OF THE DRAWING

FIG. 1 is a perspective view showing a lady's compact or the like in an open condition, a mirror and lens assembly of this invention being a part of the compact.

FIG. 2 is a perspective exploded view showing the mirror and lens assembly of FIG. 1.

FIG. 3 is an enlarged fragmentary sectional view of the mirror and lens assembly of FIGS. 1 and 2.

FIG. 4 is a sectional view, drawn on substantially the same scale as FIG. 3, showing a modification in the mirror and lens assembly of this invention.

FIG. 5 is a sectional view, drawn on substantially the same scale as FIG. 4, showing another modification in the mirror and lens assembly of this invention.

FIG. 6 is an enlarged fragmentary sectional view, with parts broken away, taken substantially on line 6—6 of FIG. 5.

FIG. 7 is a sectional view, drawn on a smaller scale than FIG. 6, showing another modification in the assembly of this invention.

DESCRIPTION OF THE PREFERRED EMBODIMENTS

FIG. 1 shows a lady's compact 12 or the like, with which a mirror and lens assembly of this invention may be a part. The compact 12 comprises a lid portion or container 14 and a base portion 16, which are attached one to the other by a hinge portion 18.

The base portion 16 has a recess 20 which is adapted to carry any suitable cosmetic material or the like.

The lid portion or container 14 is provided with a recess 22, which has a floor or end wall 24, as shown in FIG. 2. As shown in FIG. 3, a plane mirror 26 is disposed within the recess 22 and is in engagement with the floor or end wall 24. The mirror 26 may be secured to the floor 24 by any suitable means, such as by adhesive means or other attachment means.

An annular retainer member 30 fits snugly within the recess 22, encompasses the mirror 26, and is shown in engagement with the floor 24. The retainer member 30 has a flange 32 against which a lens 34 is held by means of a ring 36 of elastomeric material or the like, as shown in FIG. 3. Preferably, the retainer member 30, with the lens 34 and ring 36 are assembled as a subassembly prior to movement thereof into the recess 22.

As shown in FIG. 3, the lens 34 is maintained out of engagement with the mirror 26, is desired. However, the subassembly of the retainer member 30, the lens 34, and the ring 36 may be such that when the retainer member 30 is within the recess 22, the lens 34 engages the mirror 26.

Thus, when a person looks into the mirror 26 through the lens 34, refraction of light rays occurs. When a far-sighted person without corrective "glasses " looks into the mirror 26 through the lens 34, the lens 34 serves as corrective means so that the person is able to at close range to clearly see portions of his face in the mirror 26.

FIG. 4 shows a mirror and lens assembly of this invention in which a container member 40 has a floor or end wall 42. A plane mirror 44 is within the container member 40 and in engagement with the floor or end wall 42. An annular retainer member 46 is snugly disposed within the container member 40, encompasses the mirror 44, and engages the floor or end wall 42. The retainer member 46 has a flange 47 which engages a lens 48 and retains the lens 48 within the container member 40, as the retainer member 46 encompasses the lens 48. The flange 47, preferably, holds the lens 48 in engagement with the mirror 44, to prevent movement of the lens 48 within the container 40.

FIGS. 5 and 6 show a mirror and lens assembly of this invention in which a container member 50 has a floor or end wall 52. A plane mirror 54 is within the container member 50 and in engagement with the floor or end wall 52.

An annular retainer member 56 is snugly disposed within the container member 50, encompasses the mirror 54, and engages the floor 52. The retainer member 56 has a shoulder which engages the surface of the mirror 54. The retainer member 56 also has an annular notch within which a peripheral portion of a lens 58 is retained, as the retainer member 56 encompasses the lens 58. Thus, the annular retainer member 56 and the lens 58, as a subassembly, are movable as a unit into the container member 50, as the retainer member 56 is moved into encompassing and into engaging relationship with the mirror 54.

As shown, the lens 58 is thus retained in spaced relationship from the mirror 54.

FIG. 7 shows a mirror and lens assembly of this invention in which a container member 70 has a floor or end wall 72. A plane mirror 73 is within the container member 70 and is in engagement with the floor or end wall 72. Preferably, the mirror 73 is attached to the floor or end wall 72 by any suitable means, such as by adhesive means or by any other attachment means.

A subassembly is disposed within the container 70 and comprises a retainer 74 having a flange 76. A lens 78 is encompassed by the retainer 74 and has a peripheral portion in engagement with the flange 76. A ring 80 is snugly disposed within the annular retainer member 74 and is also in engagement with the peripheral portion of the lens 78 and holds the peripheral portion of the lens 78 in engagement with the flange 76 of the retainer member 74. Thus, as shown in FIG. 7, the lens 78 is maintained in spaced relation ship from the mirror 73.

Thus, it is understood that each embodiment of the mirror and lens assembly of this invention provides a mirror and lens unit which can be used by a far-sighted person without corrective "glasses" to see his image clearly in a mirror at close range to the mirror.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. Reflective structure for permitting a far-sighted person to see his facial image clearly at a close range, comprising:
    a housing having a recess provided with a floor, sidewalls and an open portion opposite the floor,
    a mirror having a plane surface within the recess and in engagement with the floor thereof,
    a planoconvex lens within the recess and having the convex surface thereof adjacent the plane mirror and the planosurface thereof adjacent the open portion of the recess,
    an annular retainer member within the recess and in engagement with the sidewalls thereof, the retainer member having an inwardly directed flange adjacent the opening of the recess,
    a peripheral portion of the plane surface of the lens being in engagement with the flange, an annular engagement member within the recess and in engagement with the periphery of the convex surface of the lens, the annular engagement member thus holding the lens against the flange and fixing the position of the lens within the retainer member.

2. The structure of claim 1 in which the annular engagement member is of elastomeric material.

3. The structure of claim 1 in which the retainer member encompasses the annular engagement member and is in engagement therewith.

4. The structure of claim 1 in which the retainer member encompasses the lens and is in engagement therewith.

5. The structure of claim 1 in which the plane mirror is attached to the floor of the recess.

* * * * *